(12) United States Patent
Park

(10) Patent No.: US 6,685,899 B1
(45) Date of Patent: Feb. 3, 2004

(54) CATALYST AND METHOD FOR PURIFYING EXHAUST GAS FROM VEHICLE ENGINES

(75) Inventor: Sang-cheol Park, Yongin (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 29 days.

(21) Appl. No.: 09/609,540

(22) Filed: Jun. 30, 2000

(30) Foreign Application Priority Data

Aug. 10, 1999 (KR) ......................................... 1999-32766

(51) Int. Cl.[7] .............................. B01J 8/00; B01J 21/06; B01J 23/72
(52) U.S. Cl. .................... 423/213.5; 502/244; 502/245; 502/331; 502/345
(58) Field of Search .......................... 423/213.2, 213.5; 502/244, 245, 331, 345

(56) References Cited

U.S. PATENT DOCUMENTS

| 3,896,616 | A | * | 7/1975 | Keith et al. | 60/274 |
|---|---|---|---|---|---|
| 4,221,768 | A | * | 9/1980 | Inoue et al. | 423/239 |
| 4,711,870 | A | * | 12/1987 | Yamada et al. | 502/303 |
| 5,589,432 | A | * | 12/1996 | Yoshida et al. | 502/325 |
| 5,780,002 | A | * | 7/1998 | Miyadera et al. | 423/239.1 |
| 5,882,607 | A | * | 3/1999 | Miyadera et al. | 422/177 |
| 5,948,726 | A | * | 9/1999 | Moskovitz et al. | 502/415 |

* cited by examiner

Primary Examiner—Stanley S. Silverman
Assistant Examiner—Jonas N. Strickland
(74) Attorney, Agent, or Firm—Lee & Sterba, P.C.

(57) ABSTRACT

A catalyst, method, and exhaust system for purifying exhaust gas from vehicle engines, including a catalyst having a carrier doped with copper oxide (CuO), and a precious metal as a main catalyst is disclosed. The impregnation of copper oxide into the carrier protects the catalyst from damage due to the toxicity of exhaust gas, and hinders agglomeration of precious metal particles used as the main catalyst. As a result, the heat resistance of the catalyst at high temperatures in addition to the catalytic activity for the oxidation of particulates can be improved.

16 Claims, No Drawings

CATALYST AND METHOD FOR PURIFYING EXHAUST GAS FROM VEHICLE ENGINES

BACKGROUND OF THE INVENTION

1. Field of the Invention

The present invention relates to a catalyst and method for purifying exhaust gas from vehicle engines, and more particularly, to a catalyst and method for purifying exhaust gas from diesel engines. The catalyst and method of the invention provide increased efficiency for purifying both nitrogen oxide and soot particles (particulates) from the exhaust emissions of the engine.

2. Description of the Related Art

Across the world, there is an increasing interest in preserving the environment, along with other environmental concerns. In particular, air pollution rather than water and soil pollution is caused primarily by combusters, (e.g., combustion engines), and air pollution is seriously affected by the structure of the exhaust system of the combuster, the operating principles thereof, and weather conditions. Motor vehicle combustion engines are typical combusters that cause a considerable amount of air pollution.

Air pollution produced by vehicles is quite substantial, given the fact that vehicles emit pollutants wherever they go, and the use of vehicles sharply increases with improvements in living conditions. For this reason, various regulatory agencies have imposed restrictions on the exhaust emissions from vehicles. As a result of efforts made to comply with and exceed these restrictions, development and use of a three-way catalyst and a lean burnt catalyst has achieved almost complete removal of carbon hydroxide, carbon monoxide, and nitrogen oxide from the exhaust emissions of gasoline engines.

The problems associated with diesel engines, however, are different from the problems associated with gasoline engines. In addition, the use of diesel engines has greatly increased due to the high combustion efficiency of diesel and its low cost, when compared to gasoline. Due to the combustion principle of diesel engines which burn diesel under high-pressure, and in an oxygen-rich atmosphere, diesel engines emit solid and liquid composite pollutants such as soot particles (particulates), nitrogen oxides, soluble organic substances, sulfides, etc. In particular, particulates containing a carcinogenic substance such as a multinucleate aromatic substance are considered to be the most harmful exhaust emissions, and they are emitted in the form of undesirable visible smog. For this reason, there has been significant research into development of an exhaust gas purification system for diesel engines, which has been focused primarily on the development of a catalyst that is useful for removing such particulates.

The carbonic substances contained in particulates typically are burnt by an oxidation catalyst, and then purified in the form of carbon dioxide. The temperature of diesel engines on starting, however, is room temperature, and while running, increases to 450° C. Thus, unless the oxidation temperature of the oxidation catalyst is low enough, almost all particulates that are emitted at room temperature may be discharged in the air. Oxygen catalysts having a lower activation temperature range are effective in reducing particulates.

Sulfur contained in diesel typically is emitted in the form of sulfur dioxide via combustion, and then it is oxidized into sulfur trioxide by a catalyst. Sulfur trioxide is converted into sulfuric acid by combination with moisture, which causes acid rain damage. In addition, sulfur trioxide itself serves as crystal nuclei, so that it facilitates the generation of particulates. The generation of sulfur trioxide is considered to be a factor that adversely affects the emissions purification catalysts, that deteriorates the performance of an exhaust gas post-treatment apparatus, and that increases the exhaust pressure by sticking to the apparatus. Accordingly, when developing a catalyst for oxidizing particulates of diesel engine emissions, the composition of the catalyst should be carefully considered so that it exhibits oxidation activity with respect to particulates at a temperature as low as possible, and that is stable in a sulfur dioxide atmosphere without causing oxidation of sulfur dioxide into sulfur trioxide.

Catalysts useful for purifying exhaust gases from vehicles usually are comprised of a carrier and a main catalyst. Typical examples of the carrier, which has its inherent activity and is a decisive factor in determining the characteristics of the purification catalyst, include alumina, titanium dioxide, zirconium dioxide, silicon dioxide, and the like. In addition, a precious metal, a transition metal, a rare earth metal, an alkali metal or an alkali earth metal can be added as the main catalyst. Alumina, although recognized as a stable carrier for gasoline engines, has a disadvantage when used for diesel engines in that it adsorbs sulfur dioxide at low temperatures and emits sulfur trioxide at high temperatures (e.g., of 350° C. or more) via oxidation. This oxidation increases particulates in the exhaust emissions and reduces the activity and durability of the catalyst.

Titanium dioxide and zirconium dioxide, which are used alone or in a mixture, adsorb only a small amount of sulfur dioxide and produce only a small amount of sulfate, but exhibit a sharp reduction in their specific surface area at high temperatures. These oxides therefore cannot sufficiently exert their functions as a carrier. In addition, titanium dioxide and zirconium dioxide lower the activity of precious metals and transition metals, and in turn deteriorate the catalyst. Silicon dioxide has a strong resistance against the adverse effects of both sulfur dioxide and water, but due to its low activity, a large amount of catalyst needs to be impregnated therewith.

Catalysts useful for purifying exhaust gases from vehicles typically are comprised of precious metals. Platinum (Pt) and palladium (Pd), which are typical precious metals used in a three way catalyst for gasoline engines, are known as effective catalysts due to their considerably high purification activity with respect to nitrogen oxides, in addition to hydrocarbons and carbon monoxide. Accordingly, Pt and Pd have also been used widely for purification of the exhaust gas from diesel engines.

Although Pt has an advantage of exhibiting good purification activity for nitrogen oxide in diesel engines operating under an oxygen-rich atmosphere, it has a disadvantage in that it facilitates oxidation of sulfur dioxide in an oxygen-rich atmosphere. Pt also serves as crystal nuclei for particulates, thereby increasing the amount of particulates in the exhaust. Adding vanadium oxides has been proposed to account for this problem, due to their ability to suppress the oxidizing power of sulfur dioxide. However, vanadium oxides reduce the oxidation activity for pollutants including particulates, hydrocarbons, and carbon monoxide, along with the oxidizing power of sulfur dioxide, thereby lowering the durability of the catalyst.

While Pd has an advantage in that it facilitates the oxidation activity for sulfur dioxide at fairly high temperatures, for example, at least 450° C., it has a low oxidation activity for pollutants at low temperatures and a reduced durability at low temperatures.

In terms of cost and limited reserves of precious metals, there is a need for new substitutes for precious metals. However, since a main catalyst component capable of satisfactorily substituting for a precious metal has not yet been found, the amount of the precious metal used has been reduced with the aid of co-catalysts such as transition metals, rare earth metals, and oxides of these metals. However, these co-catalysts have a low initial activity, and are adversely affected by sulfur dioxide and water, which results in reduced durability.

SUMMARY OF THE INVENTION

There exists a need to develop a catalyst and method for purifying exhaust gas from vehicle engines that provides improved purification efficiency with respect to other exhaust substances including soot particulates. There also exists a need to develop a catalyst and method for purifying exhaust gas from vehicle engines, preferably diesel engines, that provides low oxidation efficiency with respect to sulfur dioxide.

It is therefore a feature of the present invention to provide a catalyst and method for purifying exhaust gas from vehicle engines, preferably, diesel engines. The catalyst and method of embodiments of the invention provide improved purification efficiency with respect to other exhaust substances including soot particles (particulates), and they provide low oxidation efficiency with respect to sulfur dioxide.

In accordance with these and other features of the invention, there is provided a catalyst and method of purifying exhaust gases from vehicle engines that satisfies these needs. Specifically, the catalyst of an embodiment of the invention includes a carrier that is doped with copper oxide (CuO) and a precious metal, whereby the precious metal serves as a main catalyst.

In accordance with an additional feature of an embodiment of the present invention, there is provided a method of purifying exhaust gas from vehicle engines that includes contacting the exhaust gas with a catalyst that comprises a carrier that is doped with copper oxide (CuO) and a precious metal, whereby the precious metal serves as a main catalyst.

In accordance with yet another feature of the present invention, there is provided an exhaust system for a vehicle engine comprising a gas outlet portion, whereby the exhaust system includes the above-mentioned catalyst that contains a carrier doped with copper oxide and a precious metal disposed in the gas outlet portion.

These and other features of the present invention will be readily apparent to those skilled in the art upon reading the detailed description that follows.

DETAILED DESCRIPTION OF PREFERRED EMBODIMENTS

Korean patent application No. 99-32766, filed on Aug. 10, 1999, and entitled: "Catalyst for Purification of Exhaust Gas From Diesel Engines," is incorporated by reference herein in its entirety.

The present invention relates to catalysts, methods, and exhaust systems capable of purifying exhaust gas from a vehicle engine, and preferably a diesel engine. The catalyst of a preferred embodiment of the invention includes a carrier that is doped with copper oxide (CuO) and a precious metal, whereby the precious metal serves as a main catalyst. The method of a preferred embodiment of the invention purifies exhaust gas from vehicle engines by contacting the exhaust gas with a catalyst that comprises a carrier that is doped with copper oxide (CuO) and a precious metal, whereby the precious metal serves as a main catalyst. The exhaust system of a preferred embodiment of the invention includes a gas outlet portion, whereby the exhaust system comprises the above-mentioned catalyst that contains a carrier doped with copper oxide and a precious metal disposed in the gas outlet portion.

The catalyst and method of the present invention improves the oxidation efficiency with respect to soot particles (particulates) in exhaust emissions by adding copper oxide (CuO) to a carrier, such as titania, zirconia, a titania and zirconia complex, tin dioxide or silicon dioxide.

While not intending on being bound by any theory, copper oxide protects the catalyst from damage due to the toxicity of exhaust gas, and improves the oxidation activity with respect to particulates by producing a large amount of $O^2$. Copper oxide preferably is added to an existing carrier such as zirconia, titania, silica or tin dioxide. Doping copper oxide into the surface of large particles of the carrier, can suppress agglomeration of platinum (Pt, a precious metal typically doped in the carrier, and that is active at low temperatures), and in turn, the growth of platinum. As a result, the durability of the catalyst at high temperatures can be enhanced. Skilled artisans are capable of doping any suitable carrier with copper oxide, using the guidelines provided herein.

The oxidation efficiency with respect to carbon monoxide and hydrocarbon particulates can be improved in the invention by impregnating a precious metal into the CuO-doped carrier. The precious metal can be used as a main catalyst. It is preferred in this embodiment of the invention that the precious metal used as the main catalyst be selected from platinum (Pt), palladium (Pd), rhodium (Rh), rhenium (Re), or mixtures thereof.

Meanwhile, the improved oxidation efficiency with respect to particulate and gaseous substances tends to increase the oxidation of sulfur dioxide into sulfur trioxide. To avoid the generation of sulfur trioxide, the exhaust gas purification catalyst according to the present invention may include at least one co-catalyst selected from the group consisting of antimony trioxide ($Sb_2O_3$), bismuth trioxide ($Bi_2O_3$), vanadium pentoxide ($V_2O_5$), tin dioxide ($SnO_2$), and mixtures thereof.

The exhaust gas purification catalyst according to the present invention may further include additives such as manganese dioxide ($MnO_2$), ferric oxide ($Fe_2O_3$), tin dioxide ($SnO_2$), copper oxide (CuO), nickel oxide (NiO), cobaltic-cobaltous oxide ($Co_3O_4$), or mixtures and combinations thereof. These additives can improve the oxidation efficiency with respect to particulates along with the main catalyst (e.g., Pt).

It is preferred in embodiments of the present invention that the carrier has a porous structure formed from at least one of zirconia, titania, silica, tin oxide, and mixtures and complexes thereof. Preferably, the precious metal is at least one selected from the group consisting of platinum (Pt), palladium (Pd), rhodium (Rh), rhenium (Re), and mixtures thereof It is preferred in the invention that the amount of copper oxide with which the carrier is doped is within the range of 1 to 40% by weight, based on the weight of the carrier. It also is preferred in the invention that the amount of precious metal doped into the carrier is within the range of 0.01 to 3% by weight, based on the weight of the carrier.

According to other preferred embodiments of the invention, the exhaust gas purification catalyst further comprises at least one co-catalyst selected from the group consisting of antimony trioxide ($Sb_2O_3$), bismuth trioxide ($Bi_2O_3$), vanadium pentoxide ($V_2O_5$), tin dioxide ($SnO_2$), and mixtures thereof. Preferably, the carrier is doped with an amount of the co-catalyst in the range of 0.1 to 20% by weight, based on the weight of the carrier.

According to other preferred embodiments of the invention, the exhaust gas purification catalyst further comprises at least one additive selected from the group consisting of manganese dioxide ($MnO_2$), ferric oxide ($Fe_2O_3$), tin dioxide ($SnO_2$), copper oxide (CuO), nickel oxide (NiO), cobaltic-cobaltous oxide ($Co_3O_4$), and mixtures thereof. Preferably, the additive is added to the catalyst in an amount of 0.5 to 50% by weight, based on the weight of the carrier.

Doping the carrier with copper oxide in accordance with an embodiment of the invention improves the oxidation efficiency and the heat resistance of the inventive exhaust gas purification catalyst. Also, by using the co-catalyst capable of suppressing the oxidation of sulfur dioxide as well as a precious metal as the main catalyst, the oxidation of sulfur dioxide is hindered, thereby avoiding the generation of particulates. The improved catalyst therefore can be used in an improved method of purifying exhaust gas, as well as in an improved exhaust system comprising an outlet gas portion.

The present invention now will be described in greater detail with reference to the following examples and comparative examples. The following examples are for illustrative purposes and not intended to limit the scope of the invention.

EXAMPLES

Measurement of the Activity of Catalyst for Oxidation of Particulates at a Variety of Temperatures Each of the catalysts prepared in the following examples was mixed with particulates, which were taken from the muffler of a diesel engine equipped bus, in a ratio of 20:1. The mixture was made in the form of pellets and then sieved to select particles having a size of 1–2 mm. Approximately 2 g of pellets were placed into a reaction tube and the catalytic activity was measured using the following conditions with the formulated gas composition. The oxidation efficiency of particulates is proportional to the concentration of carbon dioxide. The temperature that the concentration of carbon dioxide was the highest was determined as the maximum activity temperature of the catalyst.

Gas Composition: 500 ppm NO; 800 ppm $C_3H_6$; 8% $O_2$; 2000 ppm CO; 200 ppm $SO_2$; 10% $H_2O$; He balance Reaction Temperature: 200 to 500° C.

Space Velocity: 40,000/h

Example 1

Preparation of Carrier

Approximately 30.38 g of 10 wt %-$Cu(NO_3)_2 \cdot 3H_2O$ solution was added to 100 g of zirconia ($ZrO_2$) powder and mixed by an incipient wetness method. The mixture was dried at 150° C. for 4 hours and calcined at 600° C. for 2 hours, to obtain a $ZrO_2$ carrier doped with CuO in an amount of 10% by weight with respect to the carrier.

Comparative Example 1

For comparison with the carrier of Example 1, a pure $ZrO_2$ carrier was prepared without doping with CuO.

For the purpose of investigating the effect of CuO doping on the catalytic activity of the catalyst with respect to particulates in the exhaust emissions, the oxidation temperature of particulates was measured for the carriers from Example 1 and Comparative Example 1. As a result, the oxidation temperature of particulates was 455° C. and 580° C. for Example 1 and Comparative Example 1, respectively. The oxidation of particulates by the undoped $ZrO_2$ carrier occurred at a fairly high temperature of 580° C. However, by doping the $ZrO_2$ carrier with CuO in an amount of 10% by weight, it was possible to reduce the oxidation temperature of particulates to 455° C.

Example 2 Through 4

The process of Example 1 was repeated to prepare a carrier, except that the $ZrO_2$ carrier was doped with CuO in an amount of 3% by weight. Following this, for the purpose of adding platinum (Pt), as a main catalyst, in an amount of 0.5% by weight with respect to the carrier, 0.09 g of $[Pt(NH_3)]_4Cl_2 \cdot H_2O$ was mixed with the CuO-doped carrier by an incipient wetness method. The mixture was dried at 150° C. for 2 hours and calcined at 500° C. for 2 hours, to produce a catalyst for Example 2.

For the purpose of investigating the effect of the amount of CuO with which the carrier was doped, catalysts for Examples 3 and 4 were prepared according to the process of Example 2, except that the amount of CuO was varied to 5 wt % and 10 wt %, respectively, while the amount of Pt was fixed at 0.5 wt %.

Comparative Example 2

A catalyst containing 0.5 wt % of Pt was prepared according to the process of Example 2, except that a $ZrO_2$ carrier, which was not doped with CuO, was used.

Comparative Example 3

$Cu(NO_3)_2 \cdot 3H_2O$ was mixed with Pt, rather than with a $ZrO_2$ carrier, to produce a catalyst containing 10 wt % of CuO in the catalytic layer thereof.

The oxidation temperature of particulates was measured for the catalysts from Examples 2 through 4, and Comparative Examples 2 and 3. The results are shown in Table 1 with the composition of the catalysts prepared in the examples.

TABLE 1

| Example | Composition | Oxidation Temperature of Particulates (° C.) |
| --- | --- | --- |
| Example 2 | 0.5 Pt/3 Cu—$ZrO_2$ | 405 |
| Example 3 | 0.5 Pt/5 Cu—$ZrO_2$ | 400 |
| Example 4 | 0.5 Pt/10 Cu—$ZrO_2$ | 380 |
| Comparative Example 2 | 0.5 Pt/$ZrO_2$ | 505 |
| Comparative Example 3 | 0.5 Pt—10 Cu/$ZrO_2$ | 500 |

Table 1 shows that the incorporation of CuO into the $ZrO_2$ carrier sharply drops the oxidation temperature of particulates, but doping the Pt catalytic layer with CuO, rather than doping the carrier with CuO, is not effective in lowering the oxidation temperature of particulates in the exhaust emissions.

Examples 5 Through 8

For the purpose of investigating the effect of the amount of Pt on the oxidation temperature of particulates, catalysts were prepared according to the process of Example 2, except that the amount of Pt added was varied in the range of 0.05 wt % to 0.5 wt % as shown in Table 2, while the amount of CuO with which the $ZrO_2$ carrier was doped was fixed at 10 wt %. Then, the oxidation temperature of particulates was measured for the catalysts from Examples 5 through 8. The results are shown in Table 2 with the composition of the catalysts prepared in the examples.

TABLE 2

| Example | Composition | Oxidation Temperature of Particulates (° C.) |
| --- | --- | --- |
| Example 5 | 0.05 Pt/10 Cu—$ZrO_2$ | 405 |
| Example 6 | 0.1 Pt/10 Cu—$ZrO_2$ | 395 |
| Example 7 | 0.3 Pt/10 Cu—$ZrO_2$ | 395 |
| Example 8 | 0.5 Pt/10 Cu—$ZrO_2$ | 380 |

Table 2 shows that for CuO-doped carriers, the oxidation temperature of particulates decreases as the amount of Pt increases from 0.05 wt % to 0.5 wt %. In addition, the oxidation temperature of particulates listed in Table 2 is much lower than that for Comparative Example 2 at 505° C., where the $ZrO_2$ carrier was not doped with any CuO.

Examples 9 Through 12

For the purpose of investigating the effect of addition of antimony trioxide ($Sb_2O_3$) on the oxidation temperature of particulates, catalysts were prepared according to the process of Example 2, except that antimony trichloride ($SbCl_3$) was added in an amount between about 1 wt % to 10 wt %, as shown in Table 3, while the amount of CuO with which the $ZrO_2$ carrier was doped was fixed at 10 wt %, and the amount of Pt was fixed at 0.5 wt %.

Comparative Example 4

A catalyst was prepared according to the process of Example 2, except that 0.5 wt % of Pt and 5 wt % of $Sb_2O_3$ were impregnated into a pure $ZrO_2$ carrier that was not doped with CuO.

The oxidation temperature of particulates was measured for the catalysts from Examples 9 through 12, and Comparative Example 4. The results are shown in Table 3 with the composition of the catalysts prepared in the examples.

TABLE 3

| Example | Composition | Oxidation Temperature of Particulates (° C.) |
| --- | --- | --- |
| Example 9 | 0.5 Pt 1 Sb/10 Cu—$ZrO_2$ | 385 |
| Example 10 | 0.5 Pt 3 Sb/10 Cu—$ZrO_2$ | 385 |
| Example 11 | 0.5 Pt 5 Sb/10 Cu—$ZrO_2$ | 310 |
| Example 12 | 0.5 Pt 10 Sb/10 Cu—$ZrO_2$ | 390 |
| Comparative Example 4 | 0.5 Pt 5 Sb/$ZrO_2$ | 465 |

Table 3 shows that for CuO-doped $ZrO_2$ carriers, the addition of $Sb_2O_3$ in an amount between 1 wt % and 10 wt % further lowers the oxidation temperature of particulates compared to that for the catalysts from Comparative Example 2, where a non-CuO doped carrier was used without addition of $Sb_2O_3$ as a co-catalyst, and Comparative Example 4, where a non-CuO doped carrier was used and the co-catalyst was added.

Examples 13 and 14

Catalysts were prepared according to the process of Example 2, except that the $ZrO_2$ carrier was doped with CuO in an amount of 10 wt %, and $Pd(NO_3)_2$ was added to incorporate 1 wt % of Pd, as a main catalyst, into the catalysts instead of Pt. For Example 14, $SbCl_3$ was further added to incorporate 10 wt %-$Sb_2O_3$ as a co-catalyst into the catalyst.

The oxidation temperature of particulates was measured for the catalysts from Examples 13 and 14. The results are shown in Table 4 with the composition of the catalysts prepared in the examples.

TABLE 4

| Example | Composition | Oxidation Temperature of Particulates (° C.) |
| --- | --- | --- |
| Example 13 | 1 Pd/10 Cu—$ZrO_2$ | 410 |
| Example 14 | 1 Pd 10 Sb/10 Cu—$ZrO_2$ | 390 |

Table 4 shows that for CuO-doped $ZrO_2$ carriers, the addition of Pd as a main catalyst further lowers the oxidation temperature of particulates compared to that for the catalysts from Comparative Examples 1 through 3, where a non-CuO doped $ZrO_2$ carriers was used. As for Example 14, it can be seen that the addition of $Sb_2O_3$ as a co-catalyst is effective in further reducing the oxidation temperature of particulates.

Examples 15 Through 18

Catalysts were prepared according to the process of Example 2, except that the $ZrO_2$ carrier was doped with CuO in an amount of 20 wt %, the amount of Pt was slightly varied as shown in Table 5, and $Sb_2O_3$ was incorporated into the catalyst as a co-catalyst. For Example 17, $Bi(NO_3)_3 \cdot 5H_2O$ was added instead of $Sb_2O_3$ so as to incorporate $Bi_2O_3$ into the catalyst.

The oxidation temperature of particulates was measured for the catalysts from Examples 15 and 18. The results are shown in Table 5 with the composition of the catalysts prepared in the examples.

TABLE 5

| Example | Composition | Oxidation Temperature of Particulates (° C.) |
| --- | --- | --- |
| Example 15 | 0.3 Pt 5 Sb/20 Cu—$ZrO_2$ | 335 |
| Example 16 | 0.5 Pt 5 Sb/20 Cu—$ZrO_2$ | 310 |
| Example 17 | 0.5 Pt 5 Bi/20 Cu—$ZrO_2$ | 390 |
| Example 18 | 0.5 Pt 3 Sb/20 Cu—$ZrO_2$ | 340 |

Table 5 shows that by increasing the amount of CuO with which the carrier is doped to 20 wt %, the oxidation temperature of particulates is maintained at much lower temperatures compared to the catalysts from Comparative Examples 1 through 4.

Examples 19 and 20

Catalysts were prepared according to the process of Example 11, except that $NH_4VO_3$ was added in an amount of 1 wt % and 5 wt % in Examples 19 and 20, respectively, into the catalytic layer containing 0.5 wt % of Pt and 5 wt % of $Sb_2O_3$, so as to incorporate $V_2O_5$, which is capable of suppressing the oxidation of sulfur dioxide.

The oxidation temperature of particulates was measured for the catalysts from Examples 19 and 20. The results are shown in Table 6 with the composition of the catalysts prepared in the examples.

TABLE 6

| Example | Composition | Oxidation Temperature of Particulates (° C.) |
|---|---|---|
| Example 19 | 1 V 0.5 Pt 5 Sb/10 Cu—ZrO$_2$ | 420 |
| Example 20 | 5 V 0.5 Pt 5 Sb/10 Cu—ZrO$_2$ | 425 |

Table 6 shows that the incorporation of V$_2$O$_5$ into the catalysts increases the oxidation temperature of particulates compared to when the same catalysts do not include V$_2$O$_5$. However, the temperature of the catalysts in which V$_2$O$_5$ was incorporated is still lower when compared to the catalysts from Comparative Examples 1 through 4.

Examples 21 Through 23

The process of Example 1 was repeated except that TiO$_2$ was used instead of ZrO$_2$ to prepare carriers. Following this, catalysts were prepared according to the process of Example 2, except that Pt as a main catalyst and Sb$_2$O$_3$ or Bi$_2$O$_3$ were added with the composition shown in Table 7.

The oxidation temperature of particulates was measured for the catalysts from Examples 21 through 23. The results are shown in Table 7 with the composition of the catalysts prepared in the examples.

TABLE 7

| Example | Composition | Oxidation Temperature of Particulates (° C.) |
|---|---|---|
| Example 21 | 0.5 Pt 5 Sb/10 Cu—TiO$_2$ | 410 |
| Example 22 | 0.5 Pt 5 Bi/10 Cu—TiO$_2$ | 410 |
| Example 23 | 0.5 Pt/10 Cu—TiO$_2$ | 410 |

Table 7 shows that as long as carriers are doped with CuO, the use of TiO$_2$ carrier instead of the ZrO$_2$ carrier also allows the oxidation temperature of particulates to be low.

Examples 24 Through 30

Approximately 25 g of the catalyst powder obtained in the above examples was mixed with deionized water to obtain a catalyst slurry. The slurry was coated on a honeycomb structure (having 400 cells per square inch of cross section) in a size of 20×20×50 mm$^3$ in an amount of 5 to 15% by weight with respect to the honeycomb, by washcoating. The honeycomb coated with the slurry was dried and calcined at 500° C. for 2 hours, resulting in an exhaust gas purification catalyst with a honeycomb structure.

Comparative Examples 5 and 6

The process of Examples 24 through 30 was followed except that the catalyst powder from Comparative Examples 2 and 3 was used, respectively, to obtain catalysts for comparison.

The oxidation temperature of particulates, and the oxidation ratio of SO$_2$ with respect to the reaction temperature were measured for the catalysts from Examples 24 through 30 and from Comparative Examples 5 and 6. The results are shown in Table 8 with the composition of the catalysts prepared in the examples.

TABLE 8

| Example | Composition | Oxidation T Particulates (° C.) | SO$_2$ Oxidation Ratio (%) | | | |
|---|---|---|---|---|---|---|
| | | | 300° C. | 350° C. | 400° C. | 500° C. |
| 24 | 0.5 Pt/10 Cu—ZrO$_2$ | 400 | 2 | 23 | 39 | 63 |
| 25 | 0.5 Pt 5 Sb/10 Cu—ZrO$_2$ | 406 | 4 | 3 | 10 | 8 |
| 26 | 0.5 Pt 3 Sb/10 Cu—ZrO$_2$ | 410 | 3 | 2 | 22 | 30 |
| 27 | 0.5 Pt 5 Sb 0.5 Sn/10 Cu—ZrO$_2$ | 410 | 3 | 13 | 28 | 57 |
| 28 | 0.3 Pt 5 Sb/10 Cu—ZrO$_2$ | 413 | 3 | 4 | 8 | 6 |
| 29 | 0.5 Pt 1 Sb/10 Cu—ZrO$_2$ | 408 | 2 | 3 | 20 | 37 |
| 30 | 0.5 Pt 5 Sb/5 Cu—ZrO$_2$ | 425 | 8 | 5 | 3 | 8 |
| Comp. Ex. 5 | 0.5 Pt/ZrO$_2$ | 485 | 3 | 38 | 75 | 94 |
| Comp. Ex. 6 | 0.5 Pt—10 Cu/ZrO$_2$ | 500 | 5 | 18 | 34 | 95 |

Table 8 shows that for the catalysts utilizing 10 wt % of CuO doped carrier, the oxidation temperature of particulates remains low after the coating on a honeycomb structure, when compared to Comparative Examples 5 and 6. The lower oxidation temperature of particulates means improved oxidation efficiency of the catalyst with respect to particulates in the exhaust emissions. For the examples including Sb$_2$O$_3$ as a co-catalyst, the reduction in the oxidation ratio of SO$_2$ at various temperatures ensures suppression of the production of particulates.

Examples 31 Through 36

The process of Examples 25 through 30 was followed except that CuO, Fe$_2$O$_3$, NiO, Co$_3$O$_4$, MnO$_2$ and SnO$_2$, respectively, were further added, in an amount of 30 wt % the weight of the slurry, to obtain a catalyst slurry.

The oxidation temperature of particulates, and the oxidation ratio of SO$_2$ with respect to the reaction temperature were measured for the catalysts from Examples 31 through 36. The results are shown in Table 9 with the composition of the catalysts prepared in the examples.

TABLE 9

| Example | Composition | Oxidation T particulates (° C.) | SO$_2$ Oxidation Ratio (%) | | | |
|---|---|---|---|---|---|---|
| | | | 300° C. | 350° C. | 400° C. | 500° C. |
| 31 | 0.5 Pt 5 Sb/10 Cu—ZrO$_2$ + 30 CuO | 400 | 0 | 0 | 10 | 36 |
| 32 | 0.5 Pt 5 Sb/10 Cu—ZrO$_2$ + 30 Fe$_2$O$_3$ | 406 | 2 | 3 | 2 | 59 |
| 33 | 0.5 Pt 5 Sb/10 Cu—ZrO$_2$ + 30 NiO | 410 | 2 | 3 | 10 | 26 |
| 34 | 0.5 Pt 5 Sb/10 Cu—ZrO$_2$ + 30 Co$_3$O$_4$ | 410 | 2 | 4 | 17 | 35 |
| 35 | 0.5 Pt 5 Sb/10 Cu—ZrO$_2$ + 30 MnO$_2$ | 413 | 2 | 6 | 13 | 29 |
| 36 | 0.5 Pt 5 Sb/10 Cu—ZrO$_2$ + 30 SnO$_2$ | 408 | 3 | 5 | 16 | 33 |

Table 9 shows that the addition of 30 wt % of CuO, Fe$_2$O$_3$, NiO, Co$_3$O$_4$, MnO$_2$ and SnO$_2$ to the slurry does not affect on the oxidation efficiency of the catalysts with particulates and the oxidation properties of SO$_2$.

Heat Resistance Test

For the purpose of testing the heat resistance of the catalysts from Examples 24 through 36, and Comparative Examples 5 and 6, the catalysts were heated to 600° C. and held there for 15 hours. Following this, the oxidation temperature of particulates and the oxidation ratio of SO$_2$ with respect to the reaction temperature were measured for the catalysts. The results are shown in Tables 10 and 11.

TABLE 10

| Example | Oxidation T Particulates (° C.) | SO$_2$ Oxidation Ratio (%) | | | |
|---|---|---|---|---|---|
| | | 300° C. | 350° C. | 400° C. | 500° C. |
| Example 24 | 400 | 1 | 10 | 43 | 80 |
| Example 25 | 406 | 3 | 12 | 40 | 35 |
| Example 26 | 410 | 2 | 8 | 22 | 39 |
| Example 27 | 400 | 1 | 8 | 36 | 58 |
| Example 28 | 405 | 2 | 10 | 25 | 30 |
| Example 29 | 395 | 0 | 14 | 42 | 67 |
| Example 30 | 410 | 2 | 3 | 6 | 5 |
| Comparative Example 5 | 470 | 6 | 17 | 38 | 65 |
| Comparative Example 6 | 500 | 5 | 27 | 48 | 78 |

TABLE 11

| Example | Oxidation Temperature of Particulates (° C.) | SO$_2$ Oxidation Ratio (%) | | | |
|---|---|---|---|---|---|
| | | 300° C. | 350° C. | 400° C. | 500° C. |
| Example 31 | 430 | 2 | 7 | 30 | 36 |
| Example 32 | 420 | 2 | 5 | 8 | 63 |
| Example 33 | 427 | 0 | 7 | 35 | 40 |
| Example 34 | 420 | 6 | 27 | 48 | 60 |
| Example 35 | 410 | 3 | 9 | 11 | 34 |
| Example 36 | 405 | 2 | 7 | 18 | 35 |

Tables 10 and 11 show that the oxidation ratio of SO$_2$ at various temperatures slightly increase after the thermal treatment at 600° C. for 15 hours, but is still lower than Comparative Examples 5 and 6. In addition, the oxidation temperature of particulates remains low, and further decreases for some catalysts.

As described above, the exhaust gas purification catalyst for vehicle engines (preferably diesel engines) according to various embodiments of the present invention utilizes a carrier doped with copper oxide. The impregnation of copper oxide into the carrier protects the catalyst from damage due to the toxicity of exhaust gas, and hinders agglomeration of the precious metal particles that preferably are used as a main catalyst. As a result, the heat resistance of the catalyst at high temperatures, in addition to the catalytic activity for the oxidation of particulates, can be improved. Furthermore, the incorporation of antimony trioxide into the catalyst as a co-catalyst, which is able to suppress the oxidation reaction of sulfur dioxide, maintains the oxidation ratio of sulfur dioxide at a low level, and in turn prevents production of particulates.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A catalyst for purifying exhaust gas from vehicle engines, comprising:
   a carrier pre-doped with copper oxide (CuO);
   at least one precious metal as a main catalyst selected from the group consisting of platinum (Pt), palladium (Pd), rhodium (Rh) and rhenium (Re), wherein the at least one precious metal is doped on the surface of the pre-doped carrier; and
   at least one metal oxide as a co-catalyst selected from the group consisting of antimony trioxide (Sb$_2$O$_3$), bismuth trioxide (Bi$_2$O$_3$), tin dioxide (SnO$_2$), and mixtures thereof, wherein the at least one metal oxide is doped on the surface of the pre-doped carrier.

2. The catalyst of claim 1, wherein the carrier has a porous structure formed of at least one structure selected from the group consisting of zirconia, titania, silica, tin oxide, and mixtures thereof.

3. The catalyst of claim 1, wherein the amount of copper oxide is within the range of from 1 to 40% by weight, based on the weight of the carrier.

4. The catalyst of claim 1, wherein the amount of precious metal is within the range of from 0.01 to 3% by weight, based on the weight of the carrier.

5. The catalyst of claim 1, wherein the carrier is doped with an amount of the co-catalyst within the range of from 0.1 to 20% by weight, based on the weight of the carrier.

6. The catalyst of claim 1, further comprising at least one additive selected from the group consisting of manganese dioxide (MnO$_2$), ferric oxide (Fe$_2$O$_3$), tin dioxide (SnO$_2$), copper oxide (CuO), nickel oxide (NiO), cobaltic-cobaltous oxide (Co$_3$O$_4$), and mixtures thereof.

7. The catalyst of claim 6, wherein the additive is added to the catalyst in an amount of from 0.5 to 50% by weight, based on the weight of the carrier.

8. A method of purifying exhaust gas from vehicle engines, comprising contacting the exhaust gas with the catalyst of claim 1.

9. The method of claim 8, wherein the carrier has a porous structure formed of at least one structure selected from the group consisting of zirconia, titania, silica, tin oxide, and mixtures thereof.

10. The method of claim 8, wherein the precious metal is at least one precious metal selected from the group consisting of platinum (Pt), palladium (Pd), rhodium (Rh) and rhenium (Re).

11. The method of claim 8, wherein the amount of copper oxide is within the range of from 1 to 40% by weight, based on the weight of the carrier.

12. The method of claim 8, wherein the amount of precious metal is within the range of from 0.01 to 3% by weight, based on the weight of the carrier.

13. The method of claim 10, wherein the carrier is doped with an amount of the co-catalyst within the range of from 0.1 to 20% by weight, based on the weight of the carrier.

14. The method of claim 8, further comprising at least one additive selected from the group consisting of manganese dioxide ($MnO_2$), ferric oxide ($Fe_2O_3$), tin dioxide ($SnO_2$), copper oxide (CuO), nickel oxide (NiO), cobaltic-cobaltous oxide ($Co_3O_4$), and mixtures thereof.

15. The method of claim 14, wherein the additive is added to the catalyst in an amount of from 0.5 to 50% by weight, based on the weight of the carrier.

16. An exhaust system for a vehicle engine comprising at least a gas outlet portion, whereby the exhaust system comprises the catalyst of claim 1 disposed in the gas outlet portion.

* * * * *